April 14, 1925.
M. SCHLATTER ET AL
BUMPER FOR VEHICLES
Filed Aug. 11, 1924
1,533,764
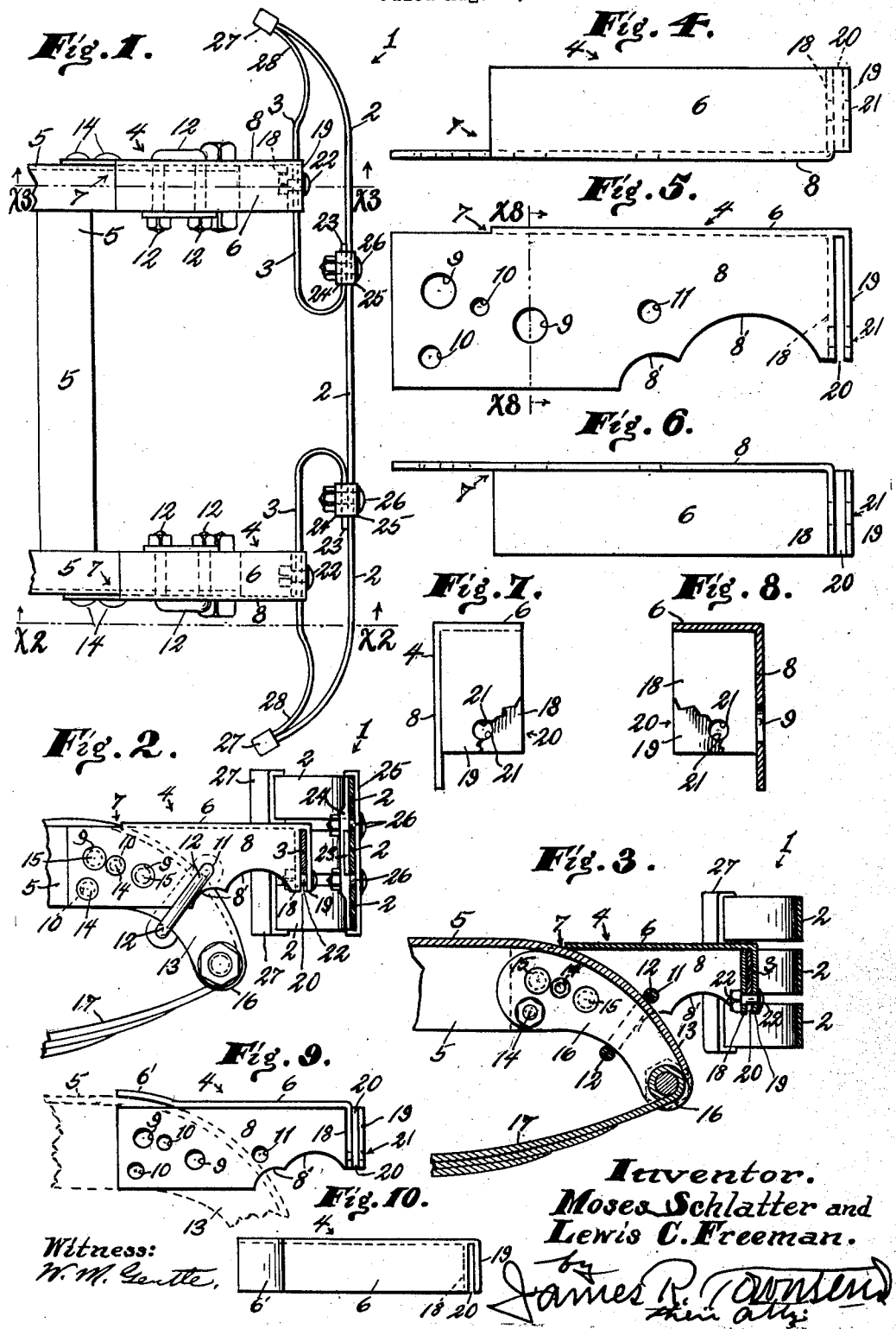

Patented Apr. 14, 1925.

1,533,764

UNITED STATES PATENT OFFICE.

MOSES SCHLATTER AND LEWIS C. FREEMAN, OF LOS ANGELES, CALIFORNIA.

BUMPER FOR VEHICLES.

Application filed August 11, 1924. Serial No. 731,341.

*To all whom it may concern:*

Be it known that we, MOSES SCHLATTER and LEWIS C. FREEMAN, citizens of the United States, residing at Los Angeles, in the county of Los Angeles and State of California, have invented a new and useful Bumper for Vehicles, of which the following is a specification.

This invention relates to means for supporting a bumper at an end of a vehicle to protect it from injury in case of a collision; and an object of the invention is to provide a bumper that is cheap and durable in construction; neat and pleasing in appearance; easily assembled and attached to a vehicle, and which is durable and effective in operation.

An object of the invention is to provide a simple and substantial means for rigidly securing a bumper to a vehicle frame.

Another object of the invention is to provide supporting brackets for a bumper that are formed of angle iron that is cut away to fit a vehicle frame, and shaped to lend a pleasing appearance thereto; and which also have their outer ends split along the integral connection of the sides; and the separated side portions bent cross-wise to one another and at right angles to the angle irons, so that the bent portions form jaws adapted to be tightened on and to hold spring bars of a bumper.

Features of the invention are shown in the construction, combination and arrangement of the parts whereby a resilient bumper is provided that is adequate to protect an end of a vehicle against the shock of an ordinary collision.

Other objects, advantages and features of invention may appear from the accompanying drawing, the subjoined detail description and the appended claims.

The accompanying drawing illustrates the invention.

Figure 1 is a plan view of a bumper constructed in accordance with this invention; showing it secured to a fragmental end of a vehicle frame.

Fig. 2 is a cross section on line $x^2$, Fig. 1.

Fig. 3 is a cross section on line $x^3$, Fig. 1.

Fig. 4 is an enlarged plan view of a right hand supporting bracket.

Fig. 5 is an outside view of the bracket shown in Fig. 4.

Fig. 6 is an underside view of the bracket shown in Fig. 4.

Fig. 7 is a fragmental front end view of the bracket shown in Fig. 4.

Fig. 8 is a fragmental sectional view on line $x^8$, Fig. 5.

Fig. 9 is an inside view of a left hand bracket showing an interchanged position of the clamp jaws; and also showing a top side portion of the angle iron curved up and arranged to fit over a curving surface of a vehicle frame. This curving portion of the angle iron is shown as cut away in the preceding figures.

Fig. 10 is a plan view of the bracket shown in Fig. 9.

The buffer indicated in a general way at 1 comprises the guard bars 2, and spring bars 3 carried by brackets 4, and these parts are connected together so as to be secured to and supported at the end of a vehicle frame 5, fragmentally shown in Figs. 1, 2 and 3.

The brackets 4 are formed of angle irons and are constructed right and left hand so that they can be fitted to the ends and secured to the outside or inside of a vehicle frame and preferably to the outside as shown in the drawing.

The rear top sides 6 of the angle irons 4 are either cut away at 7 as shown in Figs. 1 to 8, or are split along the integral connection of the sides, so that the rear top side portion 6' can be curved upward to fit the curving top surface of a vehicle frame as illustrated by full and dotted lines in Fig. 9.

The sides 8 of the angle irons 4 can be provided with numerous bolt holes 9, 10 that can be arranged therein to register with similar bolt holes that may vary as to position in different vehicle frames; also the sides 8 are provided with holes 11 for the U-bolts 12 that are adapted to be extended around and be secured to the ends 13 of the frame; and bolts 14 are provided for extending through the holes 10 for additionally securing the brackets 4 to the vehicle frame 5.

The holes 9 are provided in the sides 8 so that they can be fitted over the heads of the rivets 15 that are usually employed to secure the bearings 16 to the ends 13 of the frame 5; and, as is well known, the purpose of the bearings 16 is to form supports for the advance ends of the vehicle springs 17.

It is understood that any suitable means may be employed for securing the rear end of the brackets 4 to the vehicle frame 5.

The angle irons 4 for a short distance from the forward ends rearwardly are slit to separate the front portions 18 of the side 8 from the portion 19 of the top side 6, and these portions are then bent crosswise to one another and at right angles to the sides of the angle irons; and are spaced a slight distance apart to form openings 20 between them.

The parts 18, 19 form jaws that are provided with registering bolt holes 21; and the springs 3 are fitted in between the jaws and are secured therein by the bolts 22; and normally a portion of the lower edges of the spring 3 rest on the bolts 22.

The brackets 4 have their sides 8 cut away at 8' in order to improve and lend a pleasing effect to their appearance.

The springs 3 are looped and have their end portions 23 attached to the guard bars 2 by clamp blocks 24, 25 that are secured together by the spacing bolts 26.

The blocks 24, 25 are constructed and the bolts 26 arranged therewith so that the bars 2 are spaced apart the diameter of the bolts; and also so that the end portions 23 of the springs 3 are securely engaged with the intermediate bar of the guard bars.

The guard bars have their ends slightly curved rearwardly toward the vehicle frame and terminate in ornamentations 27 that are bolted to the ends of the guard bars in any well known manner; and also the ends 28 of the springs 3 are curved similar to the guard bars, and terminate in the ornamentations 27.

In practice the brackets 4 are secured to the end of a vehicle frame as shown in the drawing in which position they support the guard bars 2 a suitable distance out in front of a vehicle to protect it from serious injury in the event of an ordinary collision; and so that the shock of a collision will be imparted to the interposed springs 3 to thereby minimize injury to the vehicle.

The buffer may be constructed with only a single guard bar, or may comprise a double bar or four-bar construction, or preferably may comprise three bars, as shown.

We claim.

1. The bumper set forth having a pair of angle irons adapted to be secured to a vehicle, said angle irons provided with jaws adapted to support a buffer, and having registering holes to receive means to force the jaws toward each other.

2. The bumper set forth including a pair of angle irons adapted to be secured to a vehicle frame, said angle irons having jaws integral therewith that are adapted to support a buffer.

3. The bumper set forth including a pair of angle irons adapted to be secured to a vehicle frame, said irons having end portions, the sides of which are separated and the side portions bent cross-wise to one another and at right angles to the longitudinal axes of said irons.

4. The bumper set forth comprising a pair of angle irons adapted to be secured to a vehicle frame; jaws to said angle irons; springs secured to said jaws; and guard bars secured to said springs.

5. The bumper set forth having a pair of angle irons adapted to be secured to a vehicle frame; jaws to said angle irons that have their members arranged at right angles to one another; means for forcing the members of said jaws toward one another; and guard bars supported by said jaws.

6. The bumper set forth comprising brackets adapted to be attached to an automobile frame; jaws to said brackets that are spaced apart and arranged at right angles to one another; and a bumper bar supported by said jaws.

7. The bumper set forth comprising angle irons adapted to be attached to an automobile frame; jaws integral with said irons that are spaced apart and arranged at right angles to one another; springs adapted to be fitted in between said jaws; means for forcing said jaws against said springs; and guard bars carried by said springs.

8. The bumper set forth comprising a pair of angle irons adapted to be secured to an automobile frame; jaws integral with said irons that are spaced apart and arranged at right angles to one another, and having registering bolt holes therethrough; springs adapted to be fitted between said jaws; bolts adapted to extend through and force said jaws toward one another and against said springs; and guard bars attached to and carried by said springs.

9. A bumper bracket including an angle iron having a side and a top side; the rear end of said top side being adapted to accommodate a vehicle frame; and the front end of said side being bent at right angles thereto, and the front end of said top side being bent at right angles thereto, said front ends being adapted to form a support for the guard bars of a bumper.

10. A bumper bracket including an angle iron having a side, the forward end of which is bent at right angles thereto, and also having a top side bent at right angles thereto, said top side extending over the bent end of said side and the bent end of said top side being spaced from the bent end of said side.

In testimony whereof, we have hereunto set our hands at Los Angeles, California, this 2d day of August 1924.

MOSES SCHLATTER.
LEWIS C. FREEMAN.

Witness:
JAMES R. TOWNSEND.